United States Patent
Shimazaki et al.

(10) Patent No.: US 6,373,729 B1
(45) Date of Patent: Apr. 16, 2002

(54) ELECTRIC POWER SOURCE APPARATUS INCLUDING ELECTRIC POWER CONVERTER CIRCUIT AND METHOD FOR CONTROLLING THE SAME

(75) Inventors: Mitsuyoshi Shimazaki; Masanori Nakagawa; Kaoru Shinba; Yutaka Inaba, all of Numazu (JP)

(73) Assignee: Kokusan Denki Co., Ltd., Shizuoka-Ken (JP)

( * ) Notice: Subject to any disclaimer, the term of this patent is extended or adjusted under 35 U.S.C. 154(b) by 0 days.

(21) Appl. No.: 09/847,574

(22) Filed: May 2, 2001

Related U.S. Application Data (63) Continuation of application No. 09/603,177, filed on Jun. 26, 2000.

(30) Foreign Application Priority Data

Jun. 28, 1999 (JP) .......................................... 11-182294

(51) Int. Cl.$^7$ .......................... H02M 3/36; H02M 1/122
(52) U.S. Cl. .......................................... 363/37; 363/56
(58) Field of Search .............................. 363/37, 50, 51, 363/52, 53, 56, 39, 40; 307/64, 66, 86, 87

(56) References Cited

U.S. PATENT DOCUMENTS

| | | | | |
|---|---|---|---|---|
| 4,516,035 A | * | 5/1985 | Rhoads et al. ................. | 307/66 |
| 4,694,402 A | * | 9/1987 | McEachern et al. .......... | 702/71 |
| 4,797,570 A | | 1/1989 | Fox | |
| 4,797,800 A | * | 1/1989 | Simizu ......................... | 363/37 |
| 5,055,703 A | * | 10/1991 | Schornack ................... | 307/64 |

FOREIGN PATENT DOCUMENTS

| | | |
|---|---|---|
| JP | 04-190633 A2 | 7/1992 |
| JP | 05-015070 A2 | 1/1993 |
| JP | 05-328638 A2 | 12/1993 |

* cited by examiner

Primary Examiner—Rajnikant B. Patel
(74) Attorney, Agent, or Firm—Pearne & Gordon LLP (57) ABSTRACT

A method of controlling an electric power source apparatus including an electric power converter circuit which converts an output of an electric power source into DC or AC output and load connector terminals across which is applied an output of said converter circuit, which includes the steps of detecting a waveform of the load voltage across the load connection terminals after the output of the electric power converter circuit is stopped when an overcurrent flows through the load connection terminals, of judging a cause due to which the overcurrent flows, and of controlling said converter circuit according to the result of the judgement, wherein the electric power converter circuit is kept stopped when it is judged that the overcurrent is caused by an increase in the load and the electric power converter is so controlled that the waveform of the voltage applied across the load connection terminals from the electric power converter circuit is consistent with the waveform of the voltage detected by the voltage waveform detection step when it is judged that the overcurrent is caused by a voltage applied from another power source.

1 Claim, 10 Drawing Sheets

ELECTRIC POWER SOURCE APPARATUS INCLUDING ELECTRIC POWER CONVERTER CIRCUIT AND METHOD FOR CONTROLLING THE SAME

This application is a continuation of U.S. patent application Ser. No. 09/603,177 filed Jun. 26, 2000.

TECHNICAL FIELD OF THE INVENTION

This invention pertains to an electric power source apparatus including an electric power converter circuit for converting an output of an AC power source into a DC output or a DC power source into an AC output having an arbitrary frequency.

BACKGROUND OF THE INVENTION

There has been used an electric power source apparatus including an electric power converter circuit such as an inverter or cycloconverter for converting an output of an electric power source into a predetermined DC output or AC output. For instance, an inverter generator apparatus which is adapted to supply an output of a generator to an inverter and to obtain from the inverter a DC output having a predetermined magnitude or an AC output having a predetermined frequency and magnitude has been used as the generator apparatus having an electric source of a generator driven by a prime mover such as an internal combustion engine.

The inverter circuit used in such an inverter generator apparatus comprises a rectifier to rectify an output of an AC generator, a switch circuit in the form of a bridge circuit of on-off controllable switch elements and a filter circuit to remove an excessive frequency component from an output of the switch circuit. The output of the inverter is applied across the load connection terminals. Such a generator apparatus also comprises a load voltage detection circuit to detect a load voltage across the load connection terminals, a load current detection circuit to detect a load current flowing through the load connection terminals and a controller to control the switch elements in accordance with the voltage detected by the load voltage detection circuit and the load current detected by the load current detection circuit. The rectified output of the generator is adapted to be converted into the DC output having an arbitrary magnitude (an average value) or the DC output of the generator is adapted to be converted into the AC output having arbitrary frequency and magnitude.

In the generator apparatus, the AC output of the generator is converted by the rectifier into a constant DC voltage which is input to the switch circuit. The controller controls the output of the switch circuit by a pulse width modulation (PWM) system by turning on or off the switch elements on upper and lower sides of the bridge circuit while applying a drive signal to the diagonally disposed switch elements of the switch bridge circuit as the switch circuit so as to simultaneously turn on them during a half cycle of a predetermined sine. The voltage output from the switch circuit is applied through the load connection terminals to the load after it is converted into a smooth sinewave voltage through the filter circuit.

The sinewave voltage applied to the load terminals is detected by the load voltage detection circuit and fedback to the controller. The controller compares the instant magnitude of the output voltage with the instant value (the set value) of the predetermined sinewave voltage. The controller generates the predetermined sinewave voltage applied across the load connection terminals so that as the controller judges that the instant value of the output voltage is lower than the instant value of the predetermined sinewave voltage, it increases the duty ratio of the pulse width modulation control and as it judges that the instant value of the output voltage is higher than the instant value of the predetermined sinewave voltage, it decreases the duty ratio of the pulse width modulation control.

Also, the controller controls the overcurrent so that as the load current detected by the load current detection circuit exceeds the set value of the load current or detects the overcurrent, it stops outputting the drive signal applied to the switch elements of the switch circuit. This overcurrent control stops the output of the inverter circuit when the overcurrent flows so as to protect the switch elements of the inverter circuit.

Such an electric power apparatus can provide the voltage of predetermined frequency to the load terminals in spite of the revolution number of the generator because the DC voltage output from the rectifier can be converted into the AC voltage of arbitrary frequency by controlling the inverter circuit. Also, the apparatus can provide the DC voltage of arbitrary magnitude or average value by applying the drive signal to the diagonally disposed switch elements of the switch circuit to control one of the diagonally disposed switch elements to be turned on or off with the predetermined duty ratio.

In case that the volume of the load is relatively large, there are sometimes required to operate the two electric power source units in parallel. In this parallel operation of the two electric power source units, the corresponding two load connection terminals of the two electric power source units are connected to each other so as to simultaneously supply the electric power from the two electric power source units. The voltages generated by the two electric power source units, respectively are required to have the same frequency, the same magnitude and the same phases. If the frequencies or phases of the voltages generated by the two electric power source units are inconsistent due to some causes, the load current introduced from one of the electric power source units flows as the overcurrent into the other electric power source unit. This overcurrent control causes the output of the electric power source circuit to stop, which prevents the load from being normally driven.

It will be conceived that in order to operate the two electric power source units in parallel, the electric power converter circuits of the two electric power source units are controlled by a common controller to prevent the frequencies and the phases from being inconsistent. This will disadvantageously causes the construction of the electric power source units to be more complicated.

SUMMARY OF THE INVENTION

Accordingly, it is a principal object of the invention to provide an electric power source apparatus having an electric power converter circuit adapted to more easily operate two electric power source units in parallel without any complicated construction.

It is another object of the invention to provide a method of controlling an electric power source apparatus having an electric power converter circuit adapted to more easily operate two electric power source units in parallel without any complicated construction.

A first aspect of the present invention can be applied to an method of controlling an electric power source apparatus comprising an electric power converter circuit having on-off controllable switch elements to convert an output of an electric power source into predetermined DC or AC output by switching the switch elements and a pair of load connection terminals across which is applied an output of the electric power converter circuit while the electric power source apparatus is allowed to be driven in the condition that a voltage from another electric power source is allowed to be applied across the load connection terminals.

The method of the present invention can be accomplished by detecting a waveform of a voltage across the load connection terminals after the output of the electric power converter circuit is stopped when an overcurrent flows through the load connection terminals from the electric power converter circuit and judging whether the overcurrent is caused by an increase in the loads or by the voltage applied across the load connection terminals.

The output of the electric power converter circuit is kept stopped when it is judged that the overcurrent is caused by the increase in the load exceeding an allowable value. The output of the electric power converter circuit is restored in the condition in which the switch elements are so controlled that the waveform of the voltage applied across the load connection terminals from the electric power converter circuit is consistent with a waveform of the voltage across the load connection terminals detected by the voltage waveform detection step when it is judged that the overcurrent is caused by the voltage applied across the load connection terminals form another power source, but not by the increase in the load exceeding the allowable value.

With the aforementioned control made, since the waveform of the voltage applied across the load connection terminals from the electric power converter circuit is consistent with the waveform of the voltage applied across the load connection terminals form another power source, the electric power converter circuit and another power source can be operated in parallel without any trouble.

In the invention, "another power source" applied across the load connection terminals may be an AC or DC electric power source formed in an arbitrary manner. It may be another electric power source apparatus formed in the same manner as that to which the present invention is applied or formed in a different manner. It may be also an AC electric power source having no electric power converter circuit. Further, "another electric power source" may be a DC electric power source such as a battery or commercial electric power source.

A second aspect of the present invention can be applied to an electric power source apparatus comprising an electric power converter circuit having on-off controllable switch elements to convert an output of an electric power source into predetermined DC or AC output by switching the switch elements, a pair of load connection terminals across which is applied the output of the electric power converter circuit, a load voltage detection circuit to detect a voltage across the load connection terminals, a load current detection circuit to detect a load current flowing through the load connection terminals and a controller to control the switch elements of the electric power converter circuit in accordance with the voltage detected by the load voltage detection circuit and the load current detected by the load current detection circuit with the electric power source apparatus allowed to be driven in the condition that a voltage from another electric power source is also applied across the load connection terminals.

In this invention, the controller may include output waveform storage means to store waveform data for specifying an waveform of the voltage detected by the load voltage detection circuit while the output of the electric power converter circuit is stopped when an overcurrent is detected by the load current detection circuit, overcurrent cause judgement means to judge from the condition of the voltage stored by the output waveform storage means whether the overcurrent is caused by the increase in the load exceeding an allowable value or by the voltage applied across the load connection terminals form another power source and switch control means to control the switch elements so that the output of the electric power converter circuit is kept stopped when it is judged that the overcurrent is caused by the increase in the load exceeding the allowable value while the output of the electric power converter circuit is restored in the condition wherein the waveform of the voltage applied across the load connection terminals from the electric power converter circuit is consistent with a waveform specified by the waveform data stored by the output waveform storage means when it is judged that the overcurrent is caused by the voltage applied across the load connection terminals form another power source, but not by the increase in the load exceeding the allowable value.

Although, with the aforementioned construction made, the waveform of the voltage applied across the load connection terminals from the electric power converter circuit is controlled so as to be consistent with the waveform specified by the waveform data stored by the voltage applied across the load connection terminals from another electric power source, the switch elements may be so controlled that the waveform data of the voltage across the load connection terminals is detected in the condition that the output of the electric power converter circuit is stopped during a period required for detecting the waveform data to specify the waveform of the voltage across the load connection terminals.

In this case, the controller may include output waveform storage means to store the waveform data for specifying an waveform of the voltage detected by the load voltage detection circuit while the output of the electric power converter circuit is stopped for a set detection period and switch control means to control the switch elements of the electric power converter circuit so that the waveform of the voltage applied across the load connection terminals from the electric power converter circuit is consistent with the waveform specified by the waveform data stored by the output waveform storage means.

With the aforementioned control made, although the electric power converter circuit is stopped during the period required for specifying the waveform of the voltage across the load connection terminal, such a period may be properly ½ cycle through 2 or 3 cycles with the commercial electric power source used. Thus, since the period can be reduced to less than 60 msec., there is no actual trouble.

In this invention, an inverter circuit may be used for the electric power converter circuit, the electric power source apparatus may further comprise charge command generation means to generate a charge command to command a battery to be charged when the battery is connected as the load across the load connection terminals and the controller may further includes polarity judgement means to judge the polarity of the battery when the battery is connected across the load connection terminals whereby the switch elements of the inverter circuit is so controlled as to apply the DC voltage having a magnitude and a polarity suitably enough to charge the battery across the load connection terminals from the inverter circuit in accordance with the battery terminal voltage detected by the load voltage detection circuit and the battery polarity judged by the polarity judgement means when the charge command generation means generates the charge command.

In this manner, the battery can be charged by applying the charge command from the charge command generation means to the controller when the battery is connected across the load connection terminals. Also, in this case, since the battery can be connected across the load connection terminals without any awareness of the battery polarity, the treatment can be more easily made.

BRIEF DESCRIPTION OF THE DRAWING

The above and other objects and features of the invention will be apparent from the description of the embodiments of the invention taken along with reference to the accompanying drawings in which.

DETAILED DESCRIPTION OF EMBODIMENTS OF THE INVENTION

Figure 1:
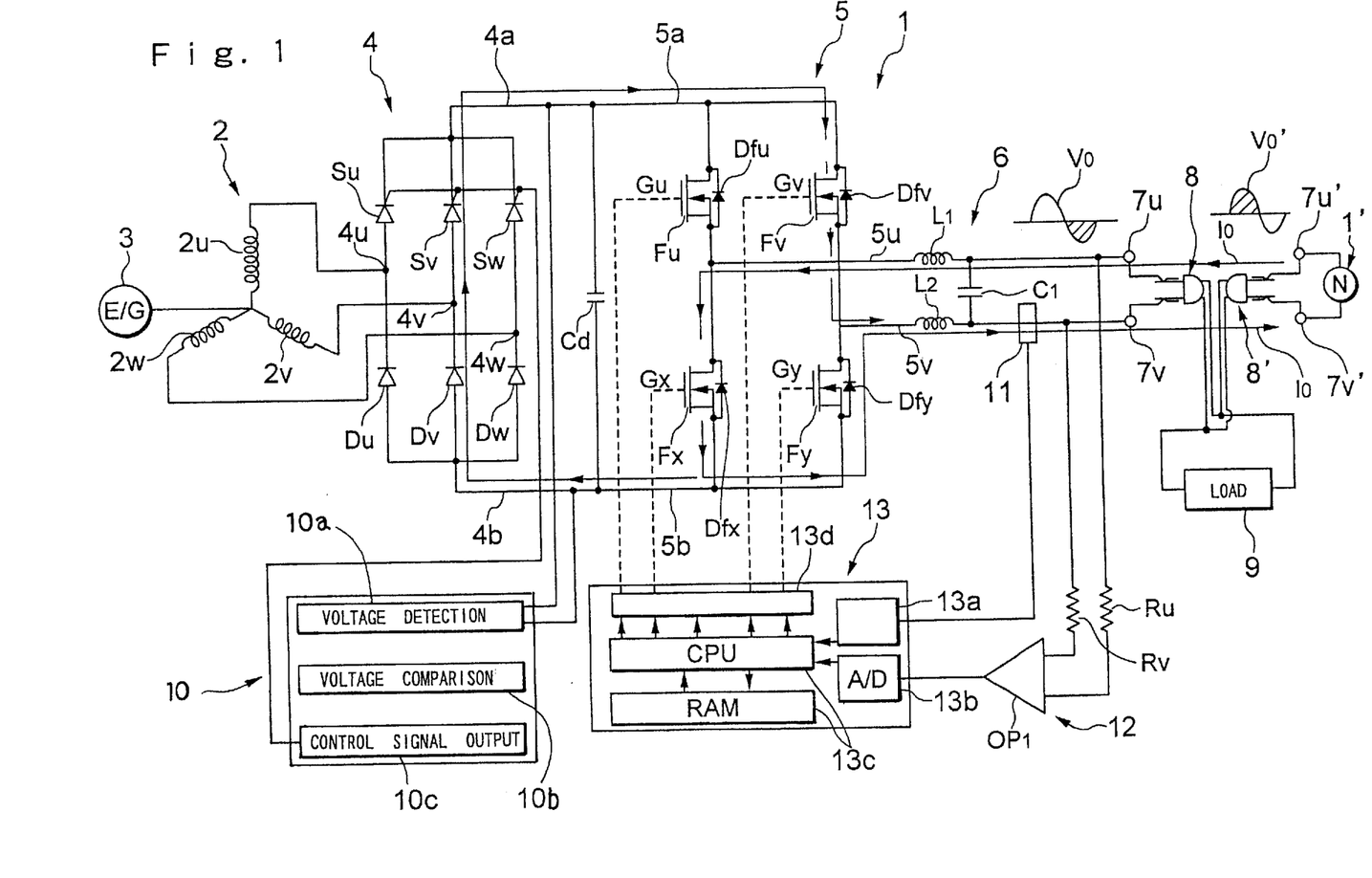
FIG. 1 is a schematic diagram of an electric power source apparatus having an electric power converter circuit constructed in accordance with one mode of the present invention.

Now referring to FIG. 1, there is an electric power source apparatus 1 to which the present invention is applied. The electric power source apparatus 1 is illustrated to comprise a three-phase magneto generator 2 driven by an internal combustion engine 3. The magneto generator 2 comprises a multipole magnet rotor (not shown) and a stator including generator coils 2u through 2w connected to each other in three phase manner. The magnet rotor is driven by a crank shaft of the internal combustion engine 3.

The electric power source apparatus 1 further comprises a control rectifier 4 having diodes Du through Dw and thyristors Su through Sw bridge-connected to each other. Three-phase output terminals of the generator 2 are connected to three-phase AC input terminals 4u though 4w of the rectifier 4 while a smoothing capacitance Cd is connected to DC output terminals 4a and 4b of the rectifier 4.

A bridge type inverter circuit (electric power converter circuit) 5 may comprise switch elements MOSFET Fu, Fv, Fx and Fy bridge-connected to each other. Incidental diodes Dfu, Dfv, Dfx and Dfy are formed between the drains and the sources of the switch elements MOSFET Fu, Fv, Fx and Fy in a manner in which the anodes of the incidental diodes Dfu, Dfv, Dfx and Dfy are directed to the sources of the switch elements MOSFET Fu, Fv, Fx and Fy. A pair of input terminals 5a and 5b of the inverter circuit 5 are connected to the output terminals 4a and 4b of the rectifier 4 while a pair of output terminals 5u and 5v of the inverter circuit 5 are connected to a pair of load connection terminals 7u and 7v, respectively through a filter circuit 6 comprising inductances L1 and L2 and a capacitance C1. A load 9 is connected to the load connection terminals 7u and 7v through a conventional plug socket type connector 8.

A control circuit 10 serves to control the thyristors Su through Sw of the rectifier 4 and comprises a voltage detection circuit 10a to detect the output voltage of the rectifier 4, a voltage comparison circuit 10b to compare the voltage detected by the voltage detection circuit 10a with a reference voltage and a control signal output circuit 10c to apply a control signal (a trigger signal) to the gates of the thyristors Su through Sw when the voltage detected by the voltage detection circuit 10a is less than the reference voltage and to stop supplying the control signal to the thyristors Su through Sw when the voltage detected by the voltage detection circuit 10a exceeds the reference voltage.

The magneto generator 2 has a drooping characteristic in which the output voltage quickly drops as the output current increases, but with the control rectifier 4 used so that the control signal is applied to the gates of the thyristors Su through Sw when the voltage detected by the voltage detection circuit 10a is less than the reference voltage and supplying the control signal to the thyristors Su through Sw stops when the voltage detected by the voltage detection circuit 10a exceeds the reference voltage, the drooping characteristic of the output of the generator 2 is corrected so that the output voltage of the rectifier which should be input to the inverter circuit 5 is kept substantially constant.

A load current detection circuit 11 serves to detect a current supplied to the load from the inverter circuit 5. A load voltage detection circuit 12 comprises an operative amplifier OP1 and resistances Ru and Rv which serves to connect input terminals of the operative amplifier OP1 to load connection terminals 7u and 7v to detect the voltage across the load connection terminals. An output of the load current detection circuit 11 and an output of the load voltage detection circuit 12 are input to a controller 13.

The controller 13 comprises a comparator 13a to compare the output of the load current detection circuit 11 with a reference signal, an A/D converter 13b to convert the output of the load voltage detection circuit 12 into a digital signal, a microcomputer 13c having a RAM and a CPU and a drive signal output circuit 13d to supply drive signals Gu, Gv, Gx and Gy to the gates of FET, Fu, Fv, Fx and Fy in accordance with the command signals generated by the CPU whereby the switch elements (FET, Fu, Fv, Fx and Fy in the illustrated embodiment) of the inverter circuit are on-off controlled in accordance with the current detected by the load current circuit 11 and the voltage detected by the load voltage detection circuit 12.

Figure 11A:
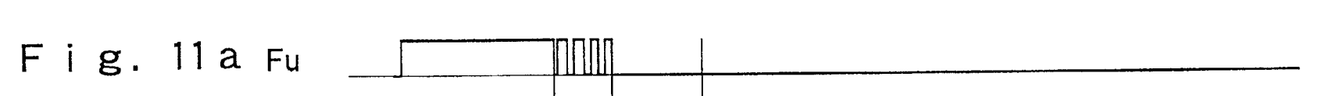
FIG. 11 is a timing chart for illustrating an operation of a prior art electric power source apparatus having an electric power converter circuit.
Figures 11B, 11C:
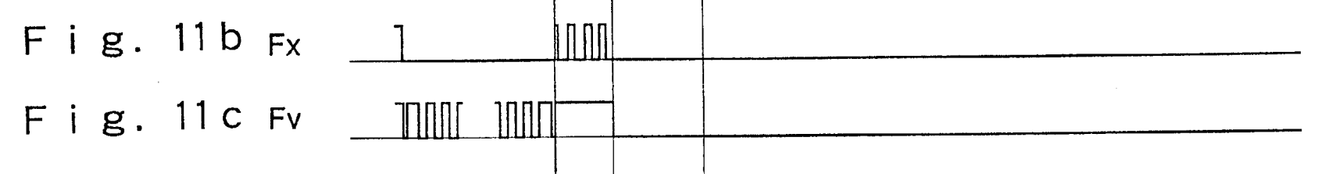
Figures 11D, 11E, 11F:
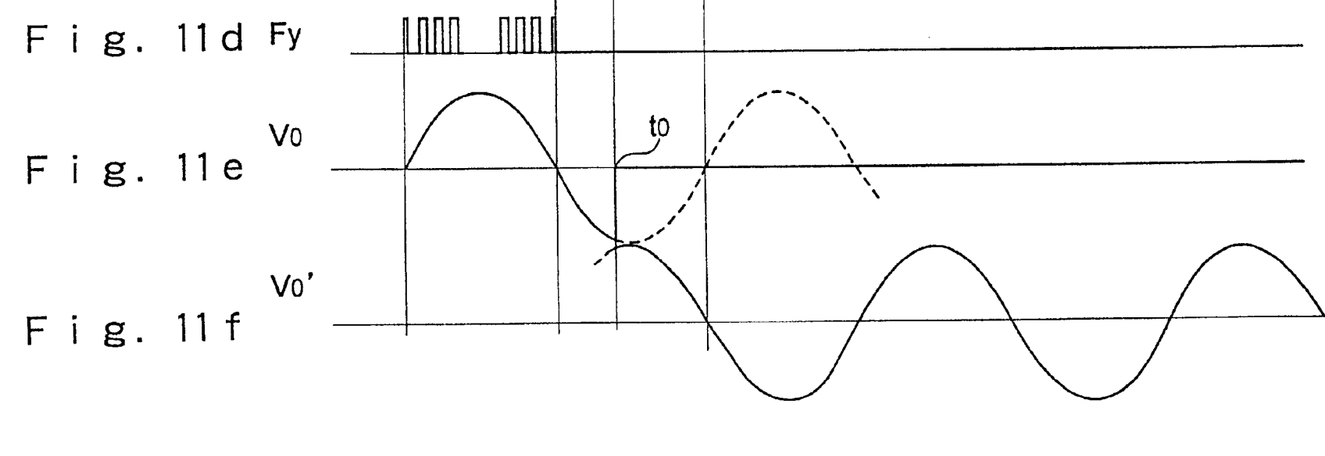

In the inverter generator apparatus shown in FIG. 1, the three phase AC voltage output by the generator 2 is converted by the control rectifier 4 into a constant DC voltage Vd which is in turn input to the inverter circuit 5. As shown in FIG. 11a through d, the controller 13 controls the output of the inverter circuit by the pulse width modulation (PWM) system by applying drive signals Gu, Gy and Gv, Gx to the pair of switch elements FET, Fu, Fy and Fv, Fx diagonally disposed in the bridge type inverter circuit during desired sinewave half cycle and simultaneously interrupting the drive signal applied to the lower side FET with the duty ratio proportional to the instant crest value of the sinewave. The voltage output by the inverter circuit 5 is applied through the load connection terminals 7u and 7v to the load 9 after it is converted through the filter circuit 6 into a smooth sinewave voltage.

The sinewave voltage applied to the load 9 is detected by the load voltage detection circuit 12 and fedback to the controller 13. The CPU of the controller 13 compares the instant magnitude of the output voltage with the instant value (the set value) of the predetermined sinewave voltage and controls the duty ratio of the pulse width modulation system so that the duty ratio increase when the instant value of the output voltage is lower than the instant value of the predetermined sinewave voltage control while the duty ratio decreases when the instant value of the output voltage is higher than the instant value of the predetermined sinewave voltage control. Thus, the predetermined sinewave voltage ie generated across the load connection terminals 7u and 7v.

In the prior art generator apparatus, the output of the inverter circuit is stopped by controlling the overcurrent so as to stop the output of the drive signal applied to the switch elements of the inverter circuit 5 in the condition in which an Enable/Disable signal is disabled or the CPU port is turned off which outputs the signal to command the switch elements of the inverter circuit 5 to be turned on when the load current detected by the load current detection circuit 11 exceeds the set value or the overcurrent is detected by the load current detection circuit 11.

Also, in the prior art inverter generator apparatus, the generator is adapted to be restored by resetting the CPU by means of the interruption of the electric power source of the CPU which can be accomplished by stopping the internal combustion engine when the operation of the inverter circuit 5 is stopped by the overcurrent control.

The electric power source of the controller 13 can be generally obtained either by generator coils separately provided from the generator coils 2u through 2w or by the output of the rectifier 4.

In the embodiment illustrated in FIG. 1, there may be provided another inverter generator unit 1' as another electric power source unit driven by an internal combustion engine separately provided from the internal combustion engine 3 driving the inverter generator apparatus 1. Load connection terminals 7u' and 7v' of the inverter generator unit 1' are connected through a connector 8' to both ends of the load 9. The inverter generator unit 1' may be constructed in the same manner as the inverter generator apparatus. The inverter generator units 1 and 1' may be operated in parallel so as to drive the load 9.

When the two inverter generator units 1 and 1' are operated in parallel, they are required to generate the voltages having the same frequency, magnitude and phase, respectively. As shown in FIG. 11, if the voltages Vo and Vo' generated by the two inverter generator units, respectively are inconsistent with each other due to some troubles, then the current drawn from one of the inverter generator unit flow into the other inverter generator unit, which causes the overcurrent to flow.

In the prior art generator apparatus, when the phases of the voltages Vo and Vo' are shifted from each other and the overcurrent is detected at time t0, the output of the inverter circuit 5 stops. In case that such an overcurrent control is made, the CPU of the controller 13 is required to be reset in order to restore the output of the inverter circuit 5. Thus, it will be noted that the operation is troublesome and in addition thereto the load cannot be normally driven because the operation of the load is interrupted.

Figure 2A:
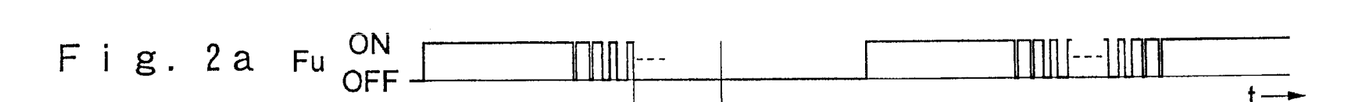
FIG. 2 illustrate a timing chart for illustrating an operation of the electric power source apparatus of FIG. 1.
Figures 2B, 2C:
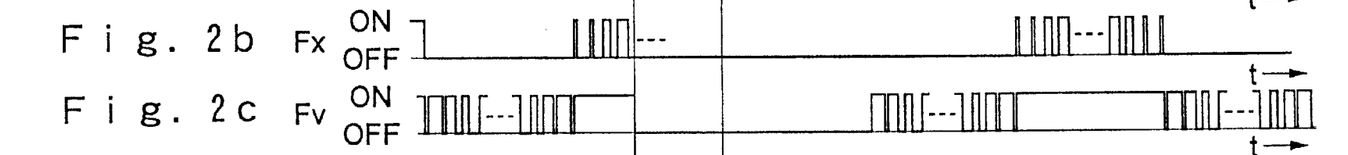
Figures 2D, 2E, 2F:
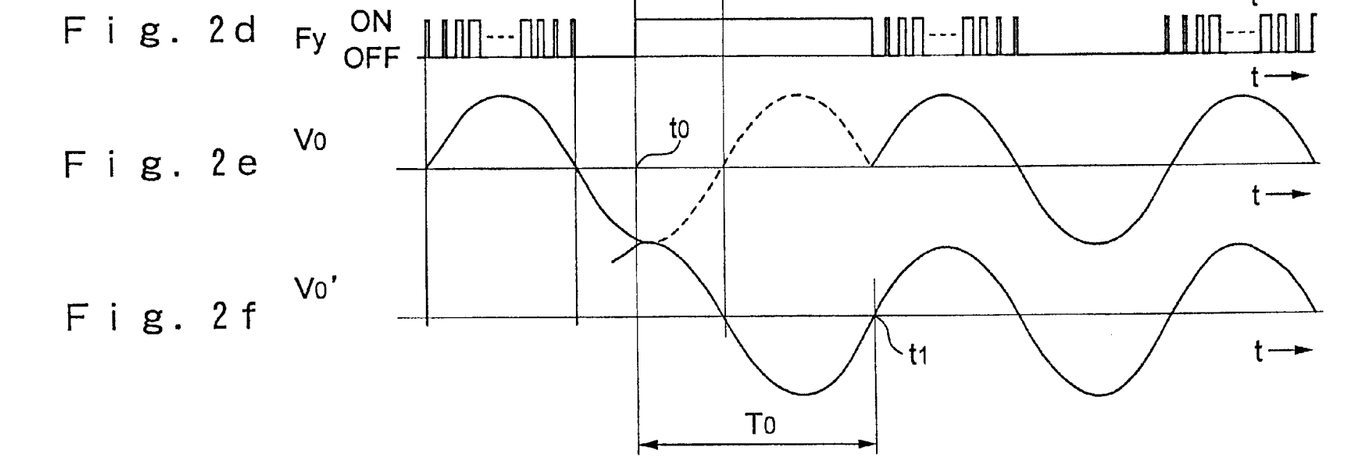

As shown in FIG. 2, the principle of the invention can be accomplished by detecting the waveform of the voltage across the load connection terminals 7u and 7v after the voltage Vo (see FIG. 2e) applied across the load connection terminals 7u and 7v from the inverter circuit 5 at time t0 is made zero by stopping the output of the inverter circuit when the overcurrent flows through the load connection terminals 7u and 7v from the inverter circuit 5 and judging the overcurrent is caused by an increase in the loads or by the voltage applied across the load connection terminals from another electric power source (the phase shift of the waveforms of the voltage applied across the load connection terminals from the inverter generator apparatus 1' and the voltage applied across the load connection terminals from the inverter circuit 5). The output of the inverter circuit is kept stopped when it is judged that the overcurrent is caused by the increase in the load exceeding an allowable value while the output of the inverter circuit is restored in the condition in which the switch elements (FET, Fu, Fv, Fx and Fy in the illustrated embodiment) are so controlled that the waveform of the voltage applied across the load connection terminals from the inverter circuit is consistent with the waveform of the voltage across the load connection terminals detected by the voltage waveform detection step or in the condition that the frequency, the magnitude and the phase of the voltage Vo applied across the load connection terminals from the inverter circuit 5 are consistent with those of the voltage Vo' applied across the load connection terminals 7u and 7v from the inverter circuit 1' when it is judged that the overcurrent is caused by the voltage applied across the load connection terminals form another power source, but not by the increase in the load exceeding the allowable value.

Although the conduction from the inverter generator apparatus 1 stops during the period To for which the output of the inverter circuit 5 is restored at time t1 after the output of the inverter circuit 5 stops at the time of t0 when the overcurrent is detected, which corresponds to the period required for detecting the data for specifying the waveform of the voltage applied across the load connection terminals and for judging the cause of the overcurrent, the load can be driven without any trouble because the time required for detecting data specifying the waveform of the voltage applied across the load connection terminals and for judging the cause of the overcurrent is ½ through 2 or 3 cycles that is at most 60 msec. in case that the output frequency is commercial frequency.

The on-off operation of the switch elements FET, Fu, Fv, Fx and Fy relative to the time t are shown in FIGS. 2a though d in the same manner as that in FIG. 11. FIGS. 2e and f show the voltage Vo applied across the load connection terminals 7u and 7v from the inverter circuit 5 and the voltage Vo' applied across the load connection terminals 7u and 7v from the inverter generator unit 1' (another electric source) relative to the time t sec.

Whether the overcurrent is caused by the increase in the load exceeding the allowable value or by the voltage applied from another electric source can be judged by the following method. For instance, it can be judged that if there is applied no voltage across the load connection terminals 7u and 7v in the condition that the output of the inverter circuit 5 is kept stopped when the overcurrent is detected, then the overcurrent is caused by the increase in the load exceeding the allowable value, but that if there is applied the voltage across the load connection terminals in the condition that the output of the inverter circuit 5 is kept stopped when the overcurrent is detected, then the overcurrent is caused by the voltage applied across the load connection terminals from another electric source.

Otherwise, with the maximum value of the load current and the overcurrent judging value lower than the maximum value set, it can be judged that the overcurrent is caused by the increase in the load when the current flowing through the load connection terminals from the inverter circuit is detected to exceed the maximum value of the load current and that the overcurrent is caused by the voltage applied from another electric source when the current flowing through the load connection terminals from the inverter circuit exceeds the overcurrent judging value, but is less than the maximum value.

Figure 3:
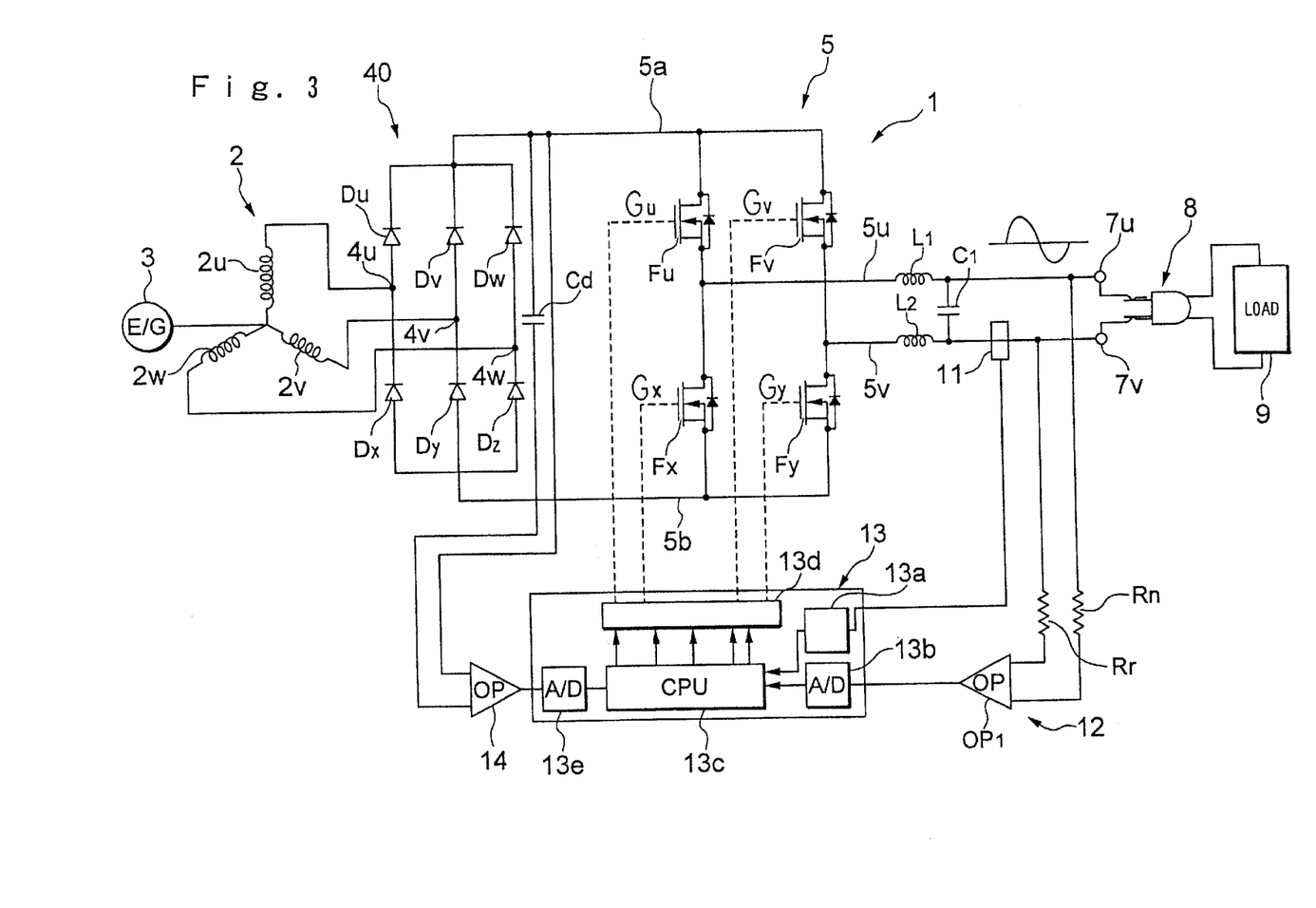
FIG. 3 is a schematic diagram of an electric power source apparatus constructed in accordance with another mode of the present invention.

Although, in the aforementioned embodiment, the constant DC voltage obtained by correcting the drooping characteristic of the generator 2 by on-off controlling the thyristors of the control rectifier 4 for rectifying the output of the generator 2 and applied to the inverter circuit 5 is converted by the inverter circuit into the voltage to be applied across the load connection terminals 7u and 7v, the control rectifier 4 may be replaced by a fullwave rectifier 40 of bridge-connected diodes Du through Dw and Dx through Dz as shown in FIG. 3 and the drooping characteristic of the generator 2 may be corrected by controlling the switch elements of the inverter circuit 5 by the pulse width modulation using the controller 13.

In the embodiment of FIG. 3, the voltage across the output terminals of the rectifier 40 is applied to input terminals of an operative amplifier 14 and an output of the operative amplifier 14 is input to the controller 13. The controller 13 comprises an A/D converter 13e through which the output voltage of the rectifier 40 detected by the operative amplifier 14 is input to the CPU of the controller 13. The other constructions are similar to those of FIG. 1.

In the embodiment of FIG. 3, the drooping characteristic of the generator 2 can be corrected by one of the switch elements diagonally disposed in the bridge circuit which is the inverter circuit and having larger duty ratio so that lowering the output current of the inverter circuit due to lowering the output voltage of the rectifier 40 is compensated.

Although, in the embodiment of FIG. 3, only the load 9 is connected across the load connection terminals 7u and 7v, in some cases, another electric source is connected across the load connection terminals 7u and 7v, which is identical to the embodiment of FIG. 1.

The inverter generator apparatus can generate not only the AC voltage of arbitrary frequency by varying the control of the inverter circuit, but also the DC voltage by simultaneously turning on the diagonally disposed pair of switch elements Fu and Fy or Fv and Fx of the bridge circuit. In case that the DC voltage is output from the inverter circuit, the polarity of the DC voltage applied across the load connection terminals 7u and 7v from the inverter circuit by varying the combination of the turned on switch elements.

Thus, another electric source connected across the load connection terminals 7u and 7v is not limited to the inverter generator unit 1', but may be a commercial electric power source or a DC power source such as a battery.

Figure 4:
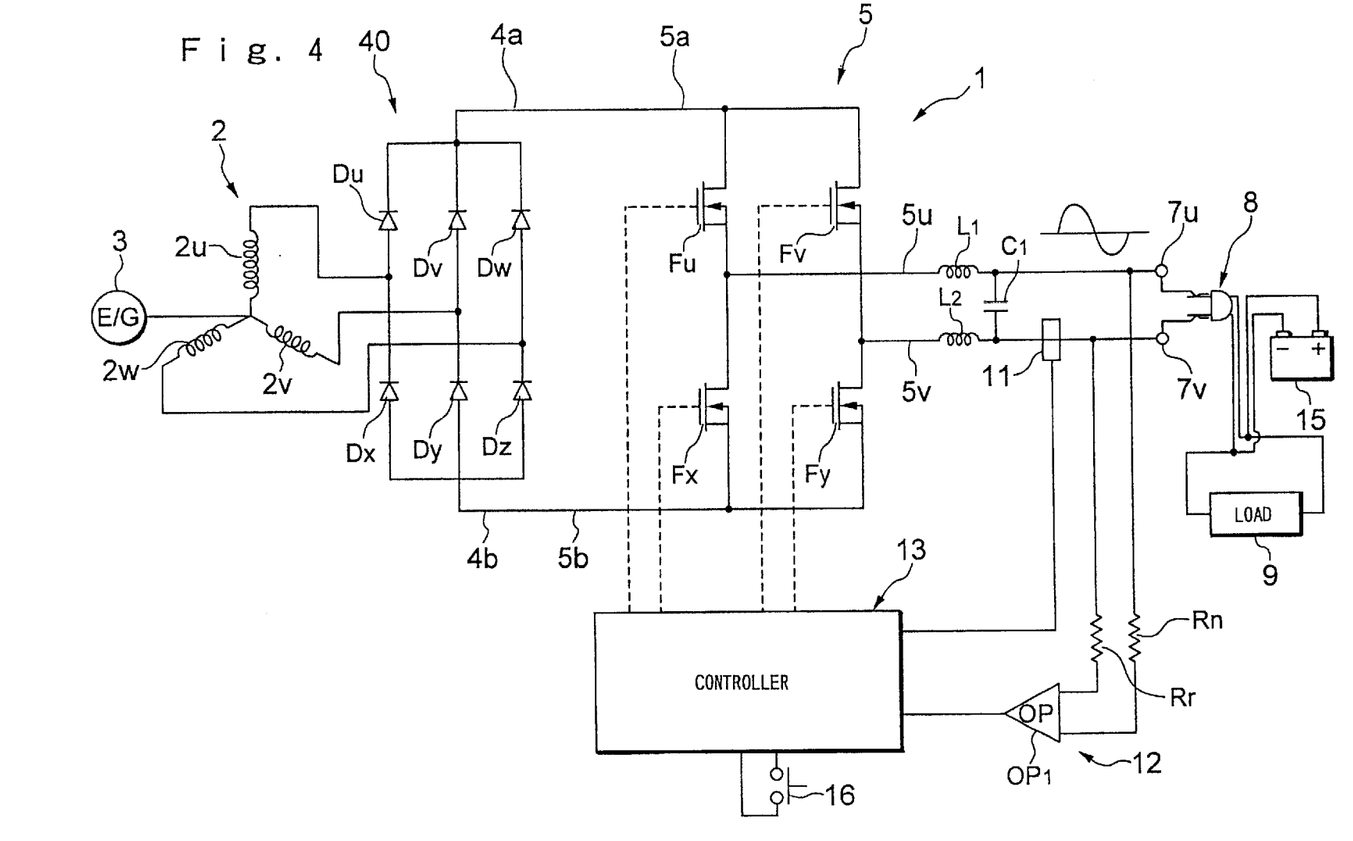
FIG. 4 is a schematic diagram of an electric power source apparatus constructed in accordance with further mode of the present invention.

FIG. 4 illustrates a battery 15 used for another electric power source and the battery 15 and the inverter generator apparatus 1 operated in parallel.

In case that the battery as another electric power source is connected across the load connection terminals 7u and 7v, a switch 16 as the charge command generation means to command the battery 15 to be charged may be desirably connected to the controller 13 as shown in FIG. 4.

The controller 13 may have polarity judgement means to judge the polarity of the battery connected across the load connection terminals 7u and 7v. The switch elements Fu, Fv, Fx and Fz may be controlled so as to apply the DC voltage of magnitude and polarity suitable for charging the battery across the load connection terminals from the inverter circuit 5 in accordance with the terminal voltage of the battery 15 detected by the load voltage detection circuit 12 and the polarity of the battery judged by the polarity judgement means when the charge command generation means generates the battery charge command (when the switch 16 is closed in the case of FIG. 4).

Figure 5:
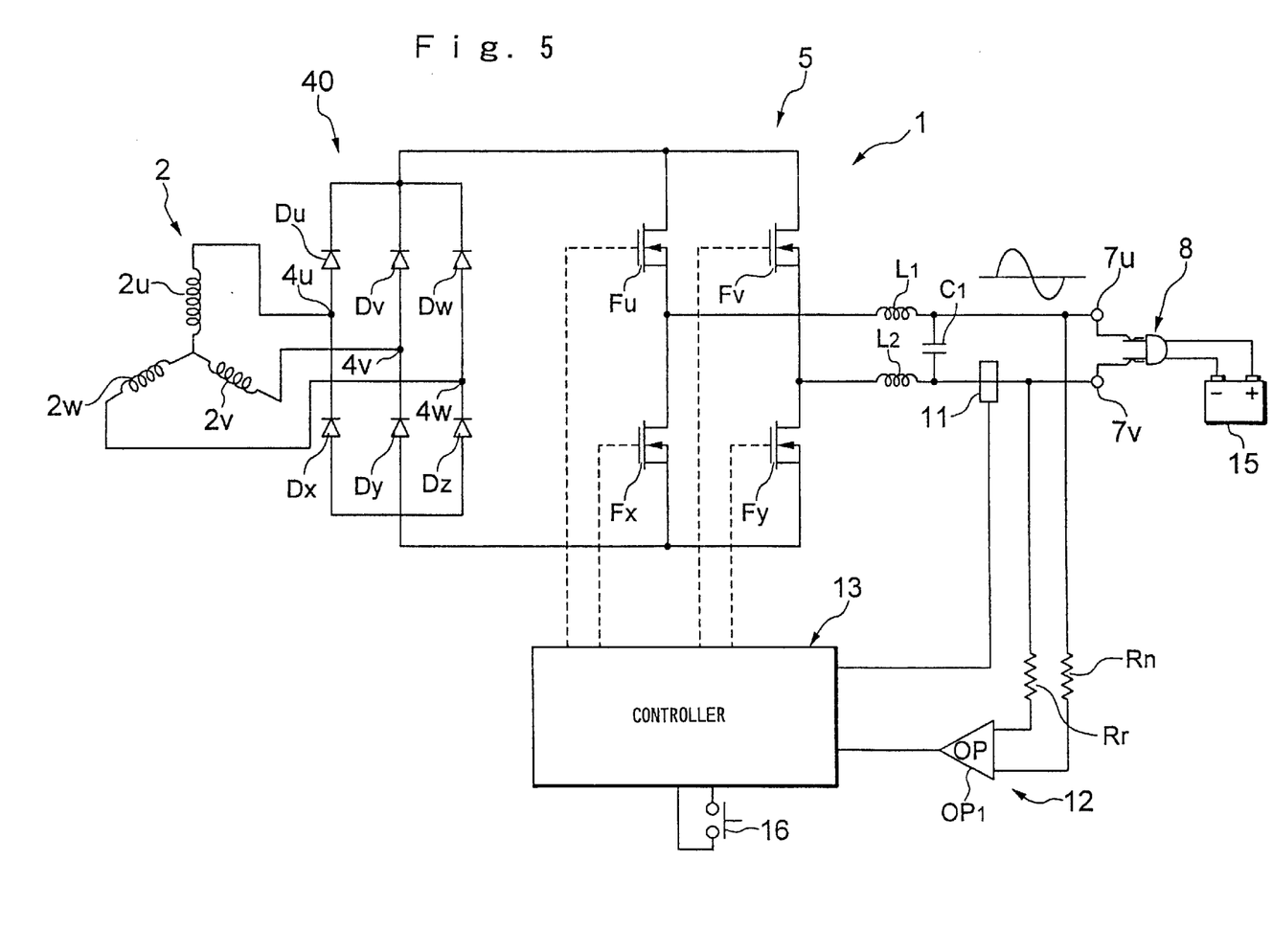
FIG. 5 is a schematic diagram of an electric power source apparatus having an electric power converter circuit constructed in accordance with further mode of the present invention.
Figure 6A:
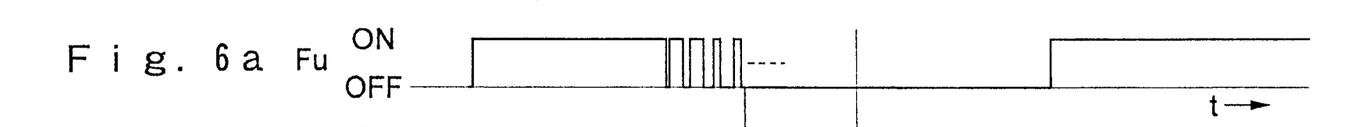
FIG. 6 illustrates a timing chart for illustrating an operation of the electric power source apparatus of FIG. 5.
Figure 6B:
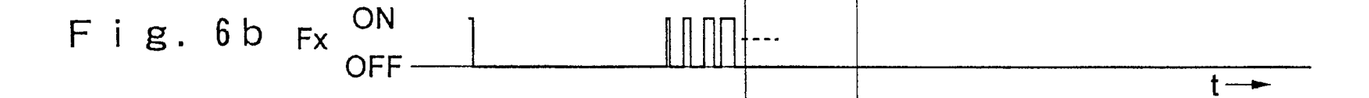
Figure 6C:
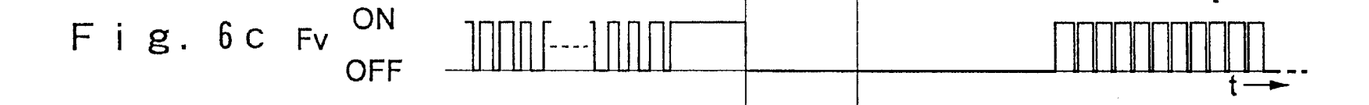
Figure 6D:
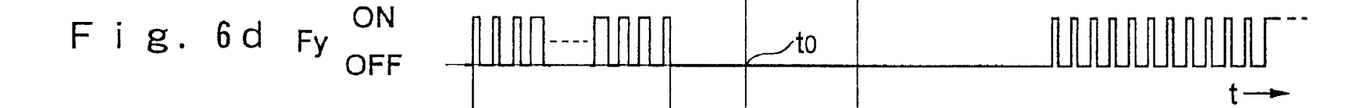
Figure 6E:
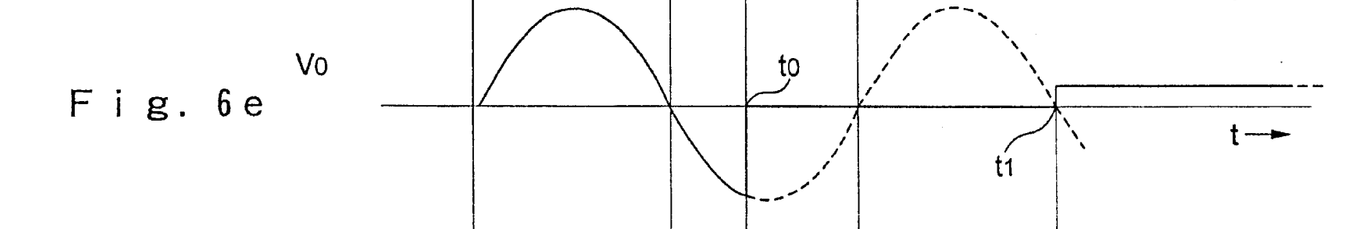
Figure 6F:
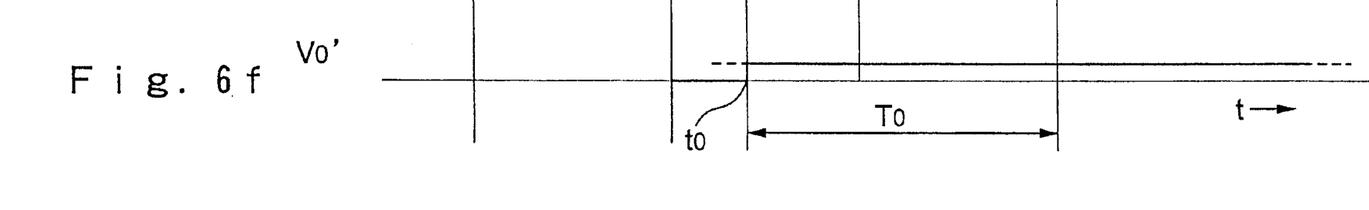

Although, in the embodiment of FIG. 4, the load 9 and the battery as another electric power source are connected across the load connection terminals 7u and 7v, only the battery 15 may be connected across the load connection terminals 7u and 7v as shown in FIG. 5 so as to use the inverter generator apparatus 1 for the purpose of charging the battery 15.

Since the polarity of the DC voltage output from the inverter circuit 5 as aforementioned can be switched, the battery 15 can be connected across the load connection terminals 7u and 7v without any consideration of its polarity by selecting the diagonally disposed switch elements Fu and Fy or Fv and Fx of the inverter circuit 5 in accordance with the detected polarity of the DC voltage when the DC voltage is applied across the load connection terminals 7u and 7v from the outside. Thus, the treatment can be made more easily.

In order to switch the control of the inverter circuit when the battery is connected across the load connection terminals 7u and 7v, it is required to detect that the battery is connected across the load connection terminals 7u and 7v and also judge the polarity of the connected battery. The detection of the connection of the battery across the load connection terminals 7u and 7v can be accomplished by detecting the voltage across the load connection terminals in the condition of stopping the output of the inverter circuit 5 and by examining the ratio of time variation in the voltage or the variation in its polarity. More particularly, when the there is shown no or little variation in the polarity of the voltage across the load connection terminals 7u and 7v in the condition of stopping the output of the inverter circuit 5, it can be judged that the battery is connected across the load connection terminals 7u and 7v. In the embodiments of FIG. 4 and 5, the polarity of the battery connected across the load connection terminals can be judged by the phase of the output of the operative amplifier OP1.

There is shown in FIGS. 6A through 6F a timing chart in which the operations of the various parts of the apparatus are illustrated in case that the battery connected across the load connection terminals 7u and 7v is charged. In this embodiment, it is supposed that the output voltage Vo' of the battery is applied across the load connection terminals 7u and 7v at the time t0. As the battery is connected across the load connection terminals, the overcurrent is detected by the load current detection circuit 11. As a result, the output of the inverter circuit 5 is stopped and the voltage Vo' across the load connection terminals 7u and 7v is detected by the load voltage detection circuit 12. After the detected voltage Vo' is judged to be a DC voltage and the polarity of the DC voltage is judged, either of the diagonally disposed switch elements Fu and Fy or Fv and Fx of the inverter circuit 5 is selected in accordance with the polarity of the battery 15 at the time t1 so as to apply the drive signal to the selected pair of switch elements while the drive signal applied to one of the selected pair of switch elements with the predetermined duty ratio whereby the DC voltage output from the inverter circuit 5 by the pulse width modulation system (PWM system). Thus, the battery 15 is charged by applying the voltage Vo slightly higher than the terminal voltage Vo' of the battery across the load connection terminals from the inverter circuit 5.

Figure 7:
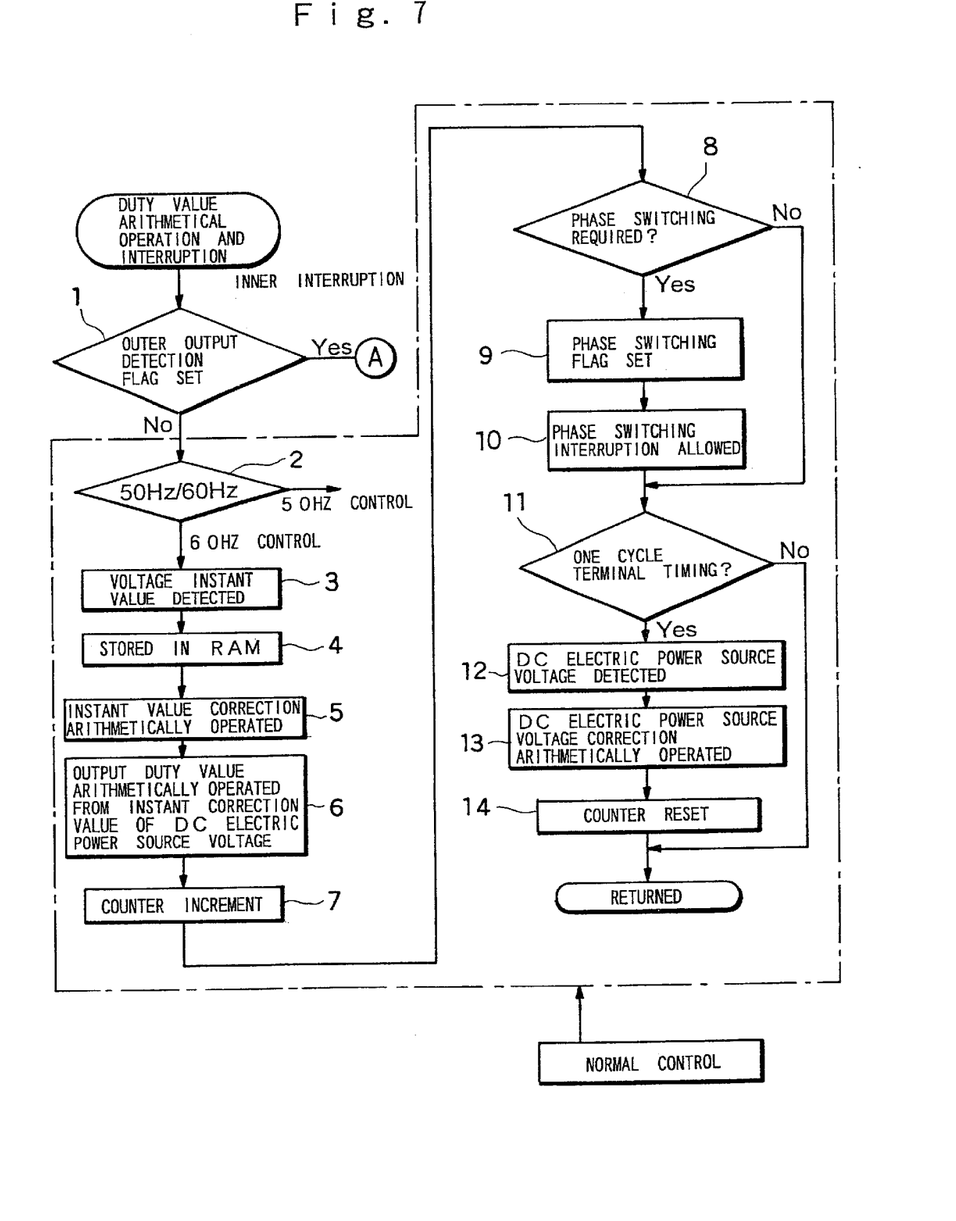
FIG. 7 is a flow chart illustrating a part of algorithm of a program practiced by a microcomputer of the electric power source apparatus of FIG. 5.
Figure 8:
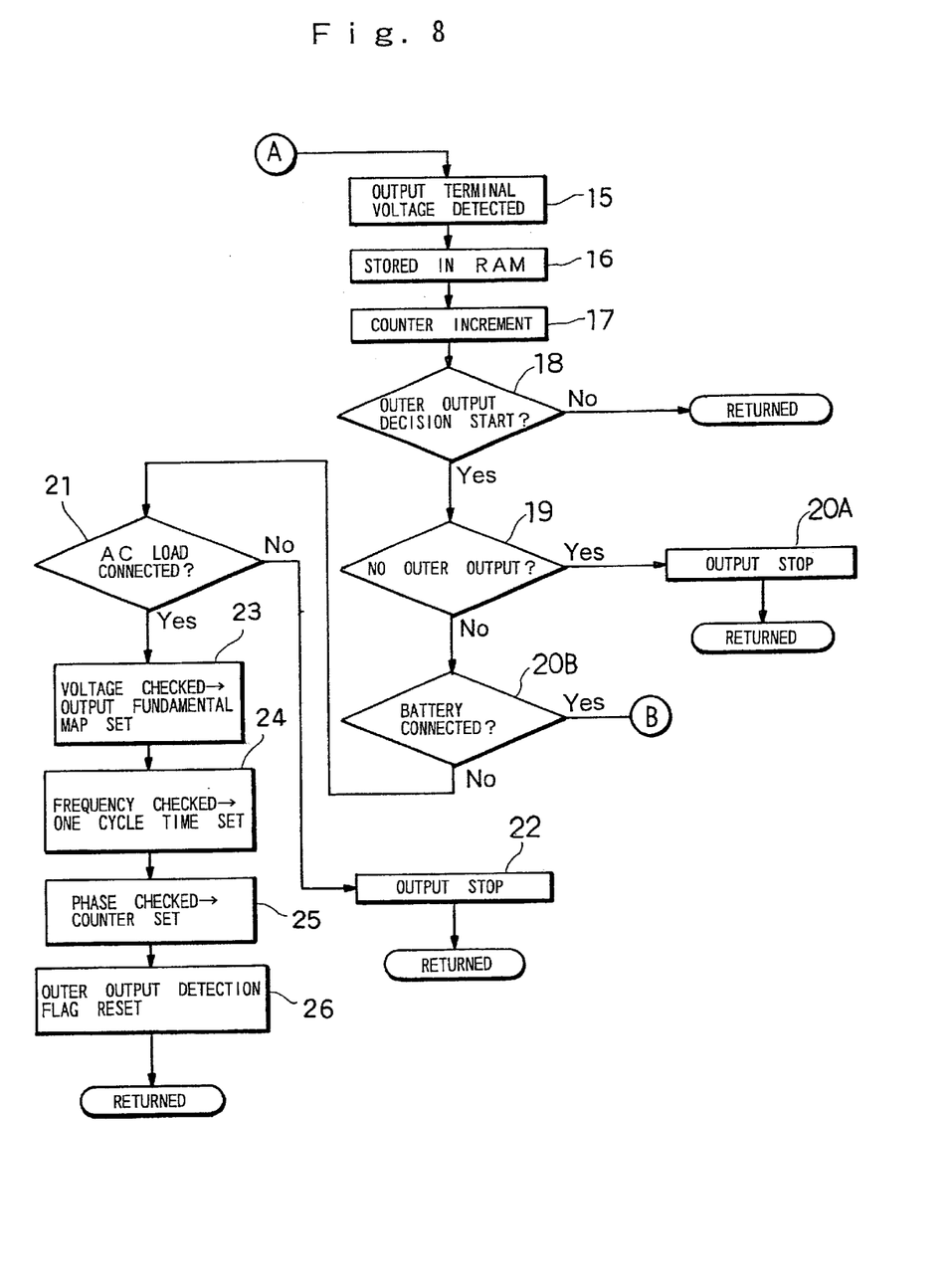
FIG. 8 is a flow chart illustrating another part of algorithm of the program practiced by the microcomputer of the electric power source apparatus of FIG. 5.
Figure 9:
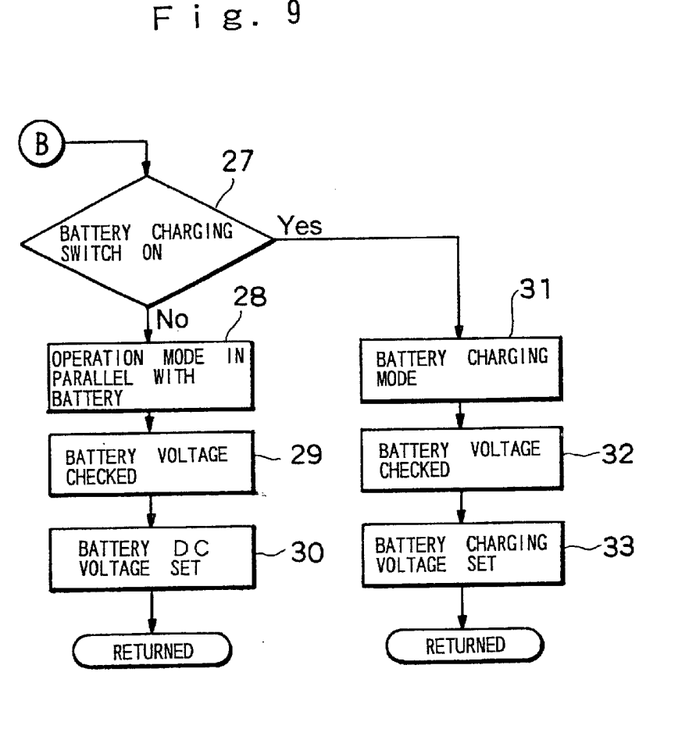
FIG. 9 is a flow chart illustrating further part of algorithm of the program practiced by the microcomputer of the electric power source apparatus of FIG. 5.
Figure 10:
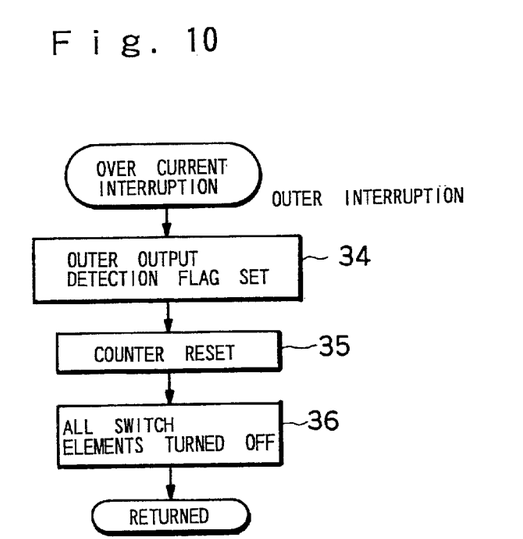
FIG. 10 is a flow chart illustrating further part of algorithm of the program practiced by the microcomputer of the electric power source apparatus of FIG. 5.

FIGS. 7 though 10 are flow charts showing an example of algorithm of a program practicing the CPU of the controller 13 shown in FIGS. 4 and 5. FIGS. 7 through 9 show an internal interruption routine practiced for constant time distance in order to determine the value of on duty of the switch elements of the inverter circuit 5 (the ratio of on-time relative to the on-off period of the switch elements of the inverter circuit turned on or off for doing the PWM control, which will be referred to as duty value herein just below). FIG. 10 shows an outer interruption routine practiced whenever the overcurrent is detected.

As the internal interruption routine starts, at the step 1 of FIG. 7, it is judged whether the outer output detection flag is set or not. The outer output detection flag is set when the overcurrent is detected by the step described later and reset after the waveform of the voltage applied across the load connection terminals from the inverter circuit 5 is made consistent with the waveform of the voltage applied across the load connection terminals 7u and 7v from the inverter circuit (another electric power source) 1'.

When the outer output detection flag is judged to be reset at the step 1, it is advanced to the step 2 where it is judged whether the command value of frequency of the AC voltage applied across the load connection terminals 7u and 7v from the inverter circuit 5 is 50 Hz or 60 Hz. In case that the frequency of the indicated AC voltage is 60 Hz, it is transferred to the step 3 where the instant value of the output voltage (the voltage across the terminals 7u and 7v) is read from the load voltage detection circuit 12 and stored by the RAM.

Then, after at the step 5 the correction value of the instant value of the voltage to be output from the inverter circuit 5 is arithmetically operated, at the step 6, the duty value of the switch elements of the inverter circuit 5 is arithmetically operated from the instant correction value and the DC electric power source correction value arithmetically operated by the later described step. After the duty value of the switch elements of the inverter circuit 5 is arithmetically operated, the counted value of the counter to count the period of one cycle of the AC voltage applied across the load connection terminals makes an increment at the step 7 and it is judged at the step 8 whether the phase switching of the counted value of the counter is required or not, whether the switching of the combination of the diagonally disposed switch elements in the turned-on condition among the switch elements of the inverter circuit is required to be switched or not or whether half cycle of the AC voltage elapse or not.

As a result, in case that the phase switching is not required or half cycle of the AC voltage is not completed, the operation is transferred to the step 11 while in case that the phase switching is required, the operation is transferred to the step 9. At the step 9, the phase switching flag is set, at the step 10 the interruption for doing the phase switching is allowed and at the step 11 it is judged from the counted value of the counter whether the timing of the present inner interruption treatment is a one cycle terminal timing or not. Thus, if it is not the one cycle terminal timing, the operation is returned to the main routine and if it is the one cycle terminal timing, the operation is transferred to the step 12 where the DC electric power source voltage (the output voltage of the rectifier 4) is detected. From the result, the DC electric power source voltage correction value (the correction value for correcting the shift of the DC electric power source voltage from the reference value) is arithmetically operated at the step 13. Thereafter, at the step 14 the counter is reset and the main routine is returned.

At the step 1 of FIG. 7, when it is judged that the outer output detection flag is set or the overcurrent is detected, the operation is transferred to the step 15 of FIG. 8 where the voltage across the load connection terminals 7u and 7v and the detected value is stored in the RAM. Then, after the counted value of the counter to count the period of half cycle of the AC voltage makes an increment at the step 17, it is judged whether the presence of the outer output (the output from another electric source) should be decided or not at the step 18. The decision of the presence of the outer output can be made by judging whether the command for operating the inverter generator apparatuses 1 and 1' in parallel is applied or not. The command may be previously applied by the operation of a switch or a keyboard before the inverter generator apparatuses start to be operated. As a result, in case that it is not required to decide the presence of the outer output, the operation is returned to the main routine while in case that it is required to decide the presence of the outer output, the operation is advanced to the step 19 where it is judged whether there is the outer output or not.

As the result that the presence of the outer output is judged at the step 19, if there is no outer output, the overcurrent detected at present is caused by the increase in the load and then the operation is transferred to the step 20A where the output of the inverter circuit 5 is stopped while the operation is returned to the main routine.

In case that it is judged that there is the outer output at the step 19, it is judged whether the battery is connected across the load connection terminals 7u and 7v at the step 20B. In order to enable the decision, the information of connection of the battery may be applied to the CPU.

When it is not judged that the battery is connected at the step 20B, the operation is advanced to the step 21 where it is judged whether the AC load is connected across the load connection terminals. In case that no AC load is connected, the operation is transferred to the step 22 where the output of the inverter circuit 5 is stopped.

In case that is judged at the step 21 that the AC load is connected, the operation is advanced to the step 23 where the voltage across the load connection terminals 7u and 7v is checked and the fundamental map is set to arithmetically operate the output voltage.

At the step 24, the frequency of the voltage across the load connection terminals 7u and 7v is checked and the time of one cycle of the AC voltage applied across the load connection terminals is set. At the step 25, the phase of the voltage across the load connection terminals 7u and 7v is checked and the counter is set to count one cycle of the AC voltage.

At the step 26, the outer output detection flag is reset and the operation is returned to the main routine. At the main routine, the fundamental map is used to arithmetically operate the instant value of the voltage applied across the load connection terminals 7u and 7v from the inverter circuit 5.

At the step 20B of FIG. 8, when it is judged that the battery is connected across the load connection terminals 7u and 7v, the operation is advanced to the step 27 of FIG. 9 where it is judged whether the battery charging switch 16 is in the turned-on condition or not. As a result, in case that the switch 16 is not turned on, the operation is transferred to the step 28 where the operation mode is such as the inverter generator apparatus 1 and the battery 15 are operated in parallel. At the step 29, the magnitude and the polarity of the battery voltage applied across the load connection terminals 7u and 7v are checked or examined. Thereafter, it is decided at the step 30 which of the switch elements of the inverter circuit 5 should be in the turned on condition so as to output the DC voltage having the magnitude equal to that of the battery voltage from the inverter circuit 5 and the duty ratio of the PWM control is set. Thus, the operation is returned to the main routine.

When it is judged at the step 27 that the battery charging switch 27 is in the turned-on condition, the operation is advanced to the step 31 where the operation mode reaches the battery charging mode. At the next step 32, the magnitude and the polarity of the battery voltage applied across the load connection terminals 7u and 7v are checked. Thereafter, the operation is transferred to the step 33 where it is decided which of the pair of switch elements Fu and Fy or Fv and Fx of the inverter circuit 5 should be in the turned-on condition so as to output the DC voltage having the magnitude suitable for charging the battery from the inverter circuit 5 and the duty ratio of the PWM control is set. Thus, the operation is returned to the main routine.

When the overcurrent is detected by the load current detection circuit 11, the outer interruption routine of FIG. 10 is practiced. In the outer interruption routine, the outer output detection flag is set at the step 34 and the counter to count the period of one cycle of the AC voltage output from the inverter circuit is reset at the step 35. Then at the step 36, after all the switch elements of the inverter circuit 5 are in the turned-off condition to stop the output of the inverter circuit 5, the operation is returned to the main routine.

In the embodiment of FIGS. 7 through 10, the output waveform storage means to store the waveform data required for specifying the waveform of the voltage detected by the load voltage detection circuit 12 while the output of the inverter circuit 5 is stopped when the overcurrent is detected by the load current detection circuit 11 can be accomplished by the outer interruption routine of FIG. 10, the step 1 of FIG. 7 and the steps 15 and 16 of FIG. 8.

The overcurrent cause judgement means to judge whether the overcurrent is caused by increase in the load exceeding the allowable value or by the voltage applied from another electric source from the condition of the voltage stored by the output waveform storage means can be accomplished by the steps 18 through 21 of FIG. 8.

The switch control means to control the switch elements so that the output of the inverter circuit is kept stopped when it is judged that the overcurrent is caused by the increase in the load exceeding, the allowable value and the output of the inverter circuit is restored in the condition in which the waveform of the voltage applied across the load connection terminals from the inverter circuit is consistent with a waveform specified by the waveform data stored by the output waveform storage mean when it is judged that the overcurrent is caused by the voltage applied across the load connection terminals form another power source, but not by the increase in the load exceeding the allowable value can be accomplished by the steps 22 through 26 of FIG. 8.

Although, in the illustrated embodiment, the switch control means controls the switch elements so that the waveform of the voltage applied across the load connection terminals from the inverter circuit is consistent with the waveform of the voltage applied across the load connection terminals from another electric source, the waveform data of the voltage across the load connection terminals may be detected in the condition of stopping the output of the inverter circuit during the period of detection required for detecting the waveform data to specify the waveform of the voltage across the load connection terminals and the switch elements may be controlled so that the waveform of the voltage applied across the load connection terminals from the inverter circuit is consistent with the waveform specified by the waveform data detected by the aforementioned voltage waveform detection step.

Although, in the illustrated embodiment, the inverter circuit is used for the electric power converter circuit, the invention may be applied to the generator apparatus comprising the electric power converter circuit to convert the output of the electric power source into the predetermined DC or AC output by switching the on-off controllable switch elements. For instance, the invention may be applied to the generator apparatus having the electric power converter circuit in the form of cycloconverter to convert the AC output of the electric power source into the AC electric power of arbitrary frequency.

According to the invention, since the waveform of the voltage applied across the load connection terminals from the electric power converter circuit is controlled so as to be consistent with the waveform of the voltage applied across the load connection terminals from another electric power whenever the overcurrent is detected, which prevents the overcurrent from flowing, the inverter generator apparatus and another electric power source can be operated in parallel without any trouble.

Although some preferred embodiments have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A method of controlling an electric power source apparatus comprising an electric power converter circuit having on-off controllable switch elements to convert an output of an electric power source into predetermined DC or AC output by switching said switch elements and a pair of load connection terminals across which is applied an output voltage of said electric power converter circuit while said electric power source apparatus is allowed to be driven in the condition that a voltage from another electric power source is allowed to be applied across said load connection terminals and comprising the steps of;

detecting waveform data of said voltage across said load connection terminals in the condition that said output of said electric power converter circuit is stopped during a period required for detecting said waveform data to specify said waveform of said voltage across said load connection terminals;

and controlling said switch elements so that said waveform of said voltage applied across said load connection terminals from said electric power converter circuit is consistent with a waveform specified by said waveform data stored by said voltage waveform detection means.

* * * * *